United States Patent
Suzuoki et al.

[11] Patent Number: 6,143,371
[45] Date of Patent: Nov. 7, 2000

[54] PROCESS FOR PRODUCING AN MG-BASED COMPOSITE MATERIAL OR AN MG ALLOY-BASED COMPOSITE MATERIAL

[75] Inventors: Masayoshi Suzuoki; Hiromitsu Kaneda; Yoshinobu Sano, all of Hamamatsu, Japan

[73] Assignee: Suzuki Motor Corporation, Shizuoka-Ken, Japan

[21] Appl. No.: 09/050,898

[22] Filed: Mar. 31, 1998

[30] Foreign Application Priority Data

May 28, 1997 [JP] Japan .................................. 9-138134

[51] Int. Cl.⁷ ...................................................... B05D 1/18
[52] U.S. Cl. ................... 427/430.1; 427/217; 427/376.6
[58] Field of Search ................... 427/430.1, 217, 427/376.6, 383.5; 164/97, 98; 428/614

[56] References Cited

U.S. PATENT DOCUMENTS

| | | | |
|---|---|---|---|
| 4,547,435 | 10/1985 | Yamatsuta et al. | 428/614 |
| 4,559,246 | 12/1985 | Jones | 427/299 |
| 4,753,690 | 6/1988 | Wada et al. | 428/614 |
| 5,028,392 | 7/1991 | Lloyd et al. | 164/97 |
| 5,277,989 | 1/1994 | Aghajanian et al. | 428/614 |
| 5,305,817 | 4/1994 | Borisov et al. | 164/97 |
| 5,786,035 | 7/1998 | Nakao et al. | 427/431 |
| 5,791,397 | 8/1998 | Suzuoki et al. | 164/97 |

FOREIGN PATENT DOCUMENTS

| | | |
|---|---|---|
| 1-279721 | 11/1989 | Japan . |
| 7-100834 | 11/1995 | Japan . |
| 2576186 | 11/1996 | Japan . |
| 2576188 | 11/1996 | Japan . |

*Primary Examiner*—Shrive Beck
*Assistant Examiner*—Bret Chen
*Attorney, Agent, or Firm*—Burns, Doane, Swecker & Mathis, L.L.P.

[57] ABSTRACT

This invention provides a process which permits impurity-free sound Mg-based composite materials and Mg alloy-based composite materials to be efficiently and inexpensively produced without pressurizing a melt of matrix metal and without using a metal oxide, finely divided metal or metal fluoride. Specifically, it provides a process for producing an Mg-based composite material or an Mg alloy-based composite material which comprises replacing the gas within a mass of reinforcing material (9) by a non-protective gas, and bringing at least a part of the mass of reinforcing material (9) into contact with a melt (7) of Mg or Mg alloy so as to infiltrate the melt (7) into the mass of reinforcing material (9).

8 Claims, 5 Drawing Sheets

PROCESS FOR PRODUCING AN MG-BASED COMPOSITE MATERIAL OR AN MG ALLOY-BASED COMPOSITE MATERIAL

BACKGROUND OF THE INVENTION

1. Field of the Invention

This invention relates to a process for producing an Mg-based composite material or an Mg alloy-based composite material.

2. Description of the Related Art

Conventionally, various techniques such as melt stirring, powder metallurgy and melt forging (or squeeze casting) have been widely used to produce Mg-based composite materials and Mg alloy-based composite materials. Among others, melt forging is mainly employed for the production of composite materials using a light metal as the matrix, because of its relatively good mass productivity. However, since melt forging involves the pressurization of a melt under a high pressure, large-scale and expensive equipment is required which causes an increase in the production cost of the composite materials. This constitutes a serious obstacle to the practical use of such composite materials.

FIG. 7 is a sectional view illustrating a conventional process for producing an Mg-based composite material or an Mg alloy-based composite material according to the melt forging technique. When a melt is handled as in this melt forging technique, a measure is usually taken to prevent the combustion of the melt by using $SF_6$ gas. Now, the aforesaid process for producing a composite material is described with reference to FIG. 7. First of all, a melt 103 of Mg or Mg alloy is poured into a metal mold 102 having a mass of reinforcing material 101 placed therein. Then, melt 103 is pressurized with a plunger 104 to form a composite material. In order to prevent the oxidation and combustion of melt 103, a protective gas (e.g., a gaseous mixture composed of $CO_2$ and 0.5% by volume of $SF_6$) 105 is previously introduced into metal mold 102.

When attention is paid to the interface between the reinforcing material and the melt of Mg or Mg alloy during the formation of a composite material, it can be seen that, in the conventional process, the reinforcing material first comes into contact with a stable (inactive) protective film present on the surface of the melt. Although this protective film is considered to be a thin film of a complex compound consisting of Mg (magnesium), O (oxygen), F (fluorine) and S (sulfur), the reinforcing material has poor wettability by the protective film and, therefore, requires the above-described pressurization of the melt during the formation of a composite material. Moreover, even if the protective film is once destroyed as a result of the pressurization of the melt, the protective gas present within the mass of reinforcing material causes a fresh protective film to be instantaneously formed on the surface of the melt. Consequently, it is necessary to pressurize the melt continuously.

In order to solve the above-described problems, it is necessary to improve the wettability of the reinforcing material by the melt of matrix metal. Such an improvement would make it possible to reduce the pressure applied to the melt or omit the pressurization of the melt. Accordingly, considerable efforts have hitherto been exerted to improve the wettability of the reinforcing material by the melt of matrix metal. However, a process which simultaneously satisfies the requirements including mass productivity, low cost and the soundness of the composite material has not been established as yet.

As proposed, for example, in Japanese Patent Publication No. 7-100834/'95, Japanese Patent No. 2576186, Japanese Patent No. 2576188, and Japanese Patent Provisional Publication No. 1-279721/'89, there is known a process in which a shaped body comprising a reinforcing material having a metal oxide, finely divided metal or metal fluoride mixed uniformly therewith is formed, and at least a part of the shaped body is brought into contact with a melt of Mg or Mg alloy so as to infiltrate the melt into the shaped body without pressurization. This process has merits from a manufacturing point of view in that the necessity of the equipment for pressurizing the melt is eliminated, the metal mold for casting use becomes unnecessary under certain conditions, and the casting yield is enhanced. Accordingly, this process is improved from the viewpoint of mass productivity and cost reduction.

However, in many cases, the metal oxide, finely divided metal or metal fluoride itself and the reaction product of this substance with the melt of matrix metal constitute impurities in the resulting composite material, resulting in a reduction in the characteristics thereof. Accordingly, the above-described process is unsatisfactory from the viewpoint of the soundness of the composite material. Moreover, it also has the disadvantage that the metal oxide, finely divided metal or metal fluoride itself causes an increase in cost.

SUMMARY OF THE INVENTION

Accordingly, an object of the present invention is to provide a process which permits impurity-free sound Mg-based composite materials and Mg alloy-based composite materials to be efficiently and inexpensively produced without pressurizing a melt of matrix metal and without using a metal oxide, finely divided metal or metal fluoride.

According to a first mode of practice of the present invention, the above object is accomplished by providing a process for producing an Mg-based composite material or an Mg alloy-based composite material which comprises replacing the gas within a mass of reinforcing material by a non-protective gas, and bringing at least a part of the mass of reinforcing material into contact with a melt of Mg or Mg alloy so as to infiltrate the melt into the mass of reinforcing material.

According to a second mode of practice of the present invention, in a process for producing an Mg-based composite material or an Mg alloy-based composite material as described above in connection with the first mode of practice, the non-protective gas consists essentially of $N_2$ gas, $O_2$ gas, $CO_2$ gas, Ar gas or a mixture thereof and is characterized in that the combined amount of these gases is not less than 98% by volume of the total amount of the gas within the mass of reinforcing material and, among other impurity gases, the concentrations of $SF_6$ gas and $SO_2$ gas are each less than 0.1% by volume based on the total amount of the gas within the mass of reinforcing material.

According to a third mode of practice of the present invention, there is provided a process for producing an Mg-based composite material or an Mg alloy-based composite material which comprises providing a mass of reinforcing material having therewithin a gas consisting essentially of $N_2$ gas, $O_2$ gas, $CO_2$ gas or a mixture thereof, the gas within the mass of reinforcing material being characterized in that the combined amount of these gases is not less than 98% by volume of the total amount of the gas within the mass of reinforcing material and, among other impurity gases, the concentrations of $SF_6$ gas and $SO_2$ gas are each less than 0.1% by volume based on the total amount of the gas within the mass of reinforcing material; bringing at least a part of the mass of reinforcing material into contact with a melt of Mg or Mg alloy while restricting the flow of gas into the mass of reinforcing material, so as to infiltrate the melt into the mass of reinforcing material without substantially pressurizing the melt; and reacting the gas within the mass of reinforcing material with the melt to create a reduced pressure within the mass of reinforcing material and thereby enhance the infiltrating power of the melt of Mg or Mg alloy.

According to a fourth mode of practice of the present invention, in a process for producing an Mg-based composite material or an Mg alloy-based composite material as described above in connection with the third mode of practice, the method for restricting the flow of gas into the mass of reinforcing material comprises immersing the mass of reinforcing material totally in the melt of Mg or Mg alloy, or surrounding the mass of reinforcing material with a metal mold and the melt.

According to a fifth mode of practice of the present invention, in a process for producing an Mg-based composite material or an Mg alloy-based composite material as described above in connection with any one of the first to fourth modes of practice, the reinforcing material comprises aluminum borate whiskers, silicon carbide particles, short alumina fibers or carbon fibers.

As is evident from the above description, the present invention requires less equipment investment and involves simple process steps. Accordingly, the process of the present invention can produce Mg-based composite materials and Mg alloy-based composite materials more inexpensively than conventional processes. Moreover, since no additive is used, the present invention can provide Mg-based composite materials and Mg alloy-based composite materials containing no impurity and hence having excellent material characteristics.

DETAILED DESCRIPTION OF PREFERRED EMBODIMENTS

Figure 1:
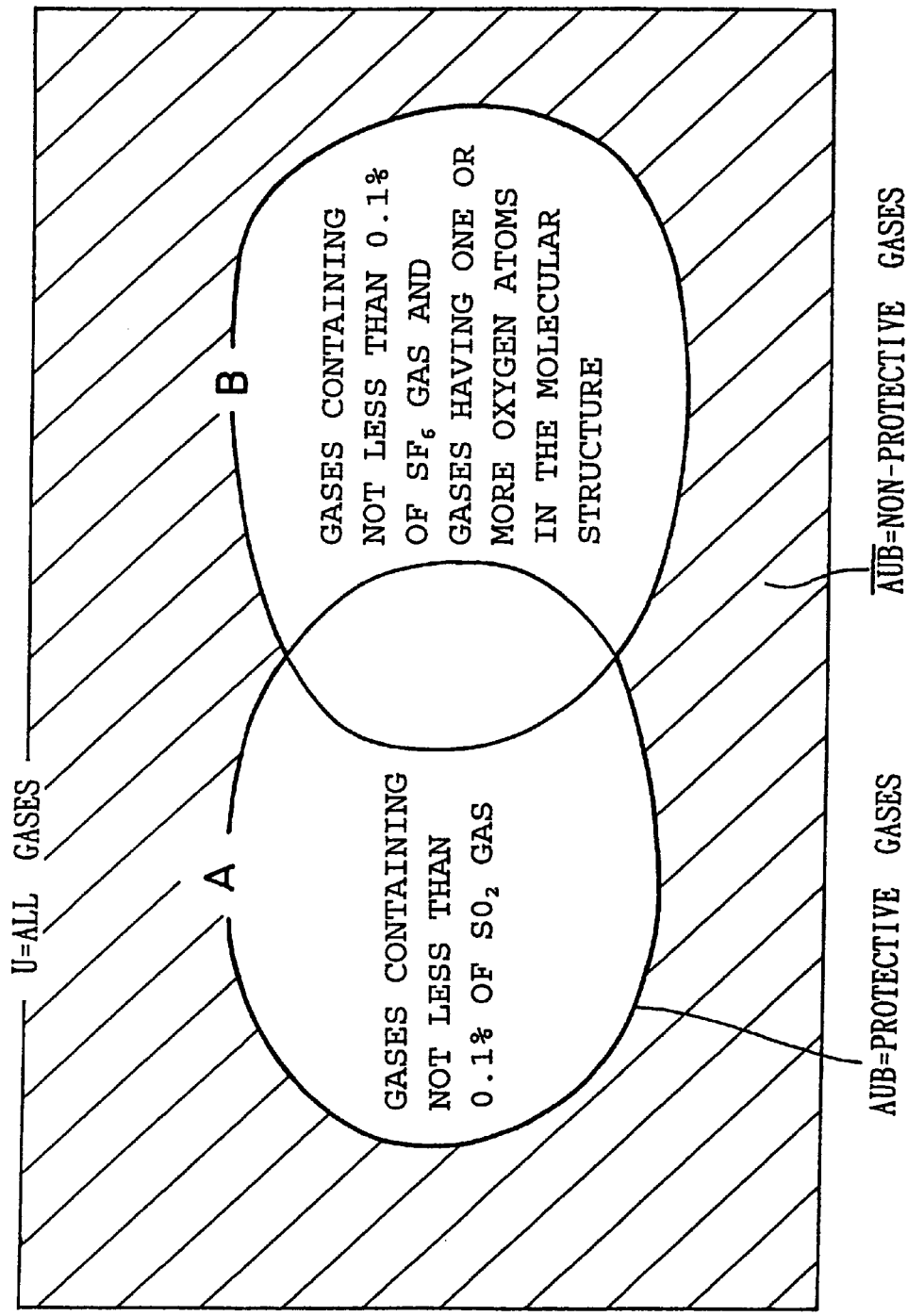
FIG. 1 is a schematic diagram (Venn diagram) for explaining protective gases and non-protective gases in accordance with the present invention on the basis of the set theory.

As a result of intensive investigations, the present inventors have now found that the above-described problems in the conventional processes for producing an Mg-based composite material or an Mg alloy-based composite material can be solved by replacing the gas within a mass of reinforcing material by a non-protective gas, and bringing at least a part of this mass of reinforcing material into contact with a melt of Mg or Mg alloy so as to infiltrate the melt into the mass of reinforcing material. According to the production process of the present invention, Mg-based composite materials and Mg alloy-based composite materials can be produced without using a metal oxide, finely divided metal or metal fluoride and without substantially pressurizing a melt of Mg or Mg alloy.

In the present invention, the reinforcing material may comprise particles, whiskers, short fibers, long fibers or a mixture thereof. The substance constituting the reinforcing material can be aluminum borate ($9Al_2O_3 \cdot 2B_2O_3$), alumina ($Al_2O_3$), silicon carbide (SiC), carbon (C), potassium titanate ($K_2O \cdot 6TiO_2$) or the like. Whiskers, short fibers and long fibers are defined as follows.

(1) Whiskers

Whiskers are single crystals having an average diameter in the range of 0.1 to 1 $\mu$m, an average length in the range of 10 to 100 $\mu$m, and an average aspect ratio in the range of 5 to 1,000.

(2) Short Fibers

Short fibers are polycrystalline fibers having an average diameter in the range of 1 to 10 $\mu$m, an average length in the range of 100 to 1,000 $\mu$m, and an average aspect ratio in the range of 5 to 1,000.

(3) Long Fibers

Long fibers are single-crystal or polycrystalline fibers having an average diameter in the range of 1 to 100 $\mu$m, an average length of not less than 1,000 $\mu$m, and an average aspect ratio of not less than 1,000.

Next, the non-protective gas used in the present invention is explained. Mg is an active metal. Accordingly, when a melt of Mg or Mg alloy is handled, some measure to prevent continuous oxidation and combustion of the melt must be taken. Conventionally, a flux has been used as this measure. Thus, the surface of the melt of Mg or Mg alloy is covered with a molten flux, so that the melt loses contact with air and is hence prevented from being oxidized or from burning. However, difficulties have frequently been encountered in that the melt is contaminated by a chloride and a fluoride which are principal ingredients of the flux, resulting in a marked reduction in the corrosion resistance of the final product.

At present, therefore, it has become common practice to melt Mg or an Mg alloy while supplying a protective gas to the surface thereof, instead of using a flux. Useful examples of this protective gas for Mg include $SF_6$ (sulfur hexafluoride) gas and $SO_2$ (sulfur dioxide) gas. In order to use $SF_6$ gas as a protective gas for Mg, the presence of oxygen is required. Accordingly, $SF_6$ gas is actually supplied to the surface of the melt in the form of a gaseous mixture composed of $SF_6$ and air, $CO_2$ (carbon dioxide) or the like. In such gaseous mixtures, $SF_6$ gas is usually used at a concentration of about 0.3 to 3% by volume. $SO_2$ gas, when used alone, can function as a protective gas for the melt of Mg or Mg alloy. In actual practice, however, $SO_2$ gas is used in the form of a gaseous mixture containing about 1% by volume of $SO_2$ gas. Under such a protective gas, the melt of Mg or Mg alloy forms a stable protective film on the surface thereof, thus preventing further continuous oxidation and combustion thereof. On the other hand, the lower limit of the concentration of $SF_6$ or $SO_2$ used as a protective gas is 0.1% by volume. If the concentration of $SF_6$ or $SO_2$ is less than 0.1% by volume, it may be difficult to form a stable protective film.

As described above, the term "protective gas" as used herein denotes any gas that forms a stable protective film on the surface of a melt of Mg or Mg alloy. Such protective gases are explained on the basis of the set theory with reference to FIG. 1. This figure is a Venn diagram showing the relationship between protective gases and non-protective gases in the set of gases.

In this figure, the universal set U is a collection of all gases. A collection of gases containing not less than 0.1% by volume of $SO_2$ gas is denoted by A, and a collection of gases containing both not less than 0.1% by volume of $SF_6$ gas and a gas having one or more oxygen atoms in the molecular structure is denoted by B. Such gases having one or more oxygen atoms in the molecular structure include, for example, $O_2$ (oxygen gas), $CO_2$ (carbon dioxide gas) and CO (carbon monoxide gas). That is, the aforesaid protective gases are gases enclosed with a bold line in FIG. 1, as denoted by A or B (A∪B).

Accordingly, the term "non-protective gas" as used herein denotes all other gases than the protective gases. In FIG. 1, the non-protective gases are denoted by the complement of A∪B, i.e., the shaded part. For example, inert gases such as Ar gas also have an anti-burning effect on the melt of Mg or Mg alloy, but does not form a protective film on the surface of the melt. Accordingly, they are non-protective gases. Moreover, as described above, $SF_6$ gas does not act as a protective gas in the absence of a gas serving as a source of oxygen supply. Accordingly, gaseous mixtures such as one composed of Ar and $SF_6$ are non-protective gases. However, since $SO_2$ gas, when used alone, can form a stable protective film, gaseous mixtures such as one composed of Ar and $SO_2$ are protective gases. Furthermore, as described above, the ability of $SF_6$ gas or $SO_2$ gas to form a stable protective film on the surface of the melt will not be sufficient if its concentration is less than a certain level. Accordingly, gases containing both less than 0.1% by volume of $SF_6$ gas and a gas having one or more oxygen atoms in the molecular structure, and gases containing less than 0.1% by volume of $SO_2$ gas are also non-protective gases.

As has been described so far, when a melt of Mg or Mg alloy is placed under a protective gas, the surface thereof (i.e., the interface between the protective gas and the melt) forms a stable (inactive) protective film, while the inner part thereof remains to be an unstable (active) melt of Mg or Mg alloy. As a result of systematic investigations, the present inventors have found that inorganic reinforcing materials have poor wettability by a stable (inactive) protective film formed on the surface of a melt of Mg or an Mg alloy, but have very good wettability by an unstable (active) melt of Mg or Mg alloy. Thus, the present inventors have devised a process for producing an Mg-based composite material or an Mg alloy-based composite material in which the gas within a mass of reinforcing material is replaced by a non-protective gas and at least a part of this mass of reinforcing material is brought into contact with an active melt of Mg or Mg alloy, whereby the melt is infiltrated into the mass of reinforcing material without substantially pressurizing the melt and without using a metal oxide, finely divided metal or metal fluoride.

In the process for producing an Mg-based composite material or an Mg alloy-based composite material in accordance with the present invention, the reinforcing material is first wetted by the melt. Then, as disclosed in Japanese Patent Application No. 8-304286/'96, a proper amount of the melt is infiltrated throughout the mass of reinforcing material owing to the effect of reducing the pressure within the mass of reinforcing material which arises from the capillary force exerted by the porous mass of reinforcing material, the hydrostatic pressure of the melt, and the reaction of the melt with the gas within the mass of reinforcing material. Thus, a perfect composite material is formed.

Moreover, by employing the process for producing an Mg-based composite material or an Mg alloy-based composite material in accordance with the present invention, there can be produced an Mg-based composite material or Mg alloy-based composite material which does not contain impurities derived from a metal oxide, finely divided metal or metal fluoride, does not exhibit the segregation of a specific element in the final filtration region, and hence has good homogeneity and high strength.

Now, one form of apparatus for carrying out the process for producing a composite material in accordance with the present invention is described below with reference to FIG. 2. However, it is to be understood that the present invention is not limited thereto, but various modified forms of apparatus may be employed. This figure is a sectional view of a vacuum melting furnace which serves as an example of the production apparatus. First of all, after a chamber 1 kept at room temperature is evacuated by means of a vacuum pump 2, a vacuum valve 3 is closed and a gas inlet valve 4 is opened. Thus, the air within chamber 1 is replaced by a specified gas. When the specified gas within chamber 1 has reached a predetermined pressure, a gas detection valve 5 is opened and the specified gas is introduced into chamber 1. In this state, a crucible 8 charged with a matrix 7 is heated by means of an electric resistance heater 6 to melt matrix 7 and maintain the resulting melt at a predetermined temperature. Since a mass of reinforcing material 9 is attached to the tip of an operating rod 10 at the initial stage of the process, the air within mass of reinforcing material 9 is replaced by the same gas as the replacement gas for chamber 1, and mass of reinforcing material 9 is preheated to a temperature almost equal to that of the melt. When the melt has reached a predetermined temperature, operating rod 10 is lowered to bring mass of reinforcing material 9 into contact with the melt.

Figures 3A, 3B:
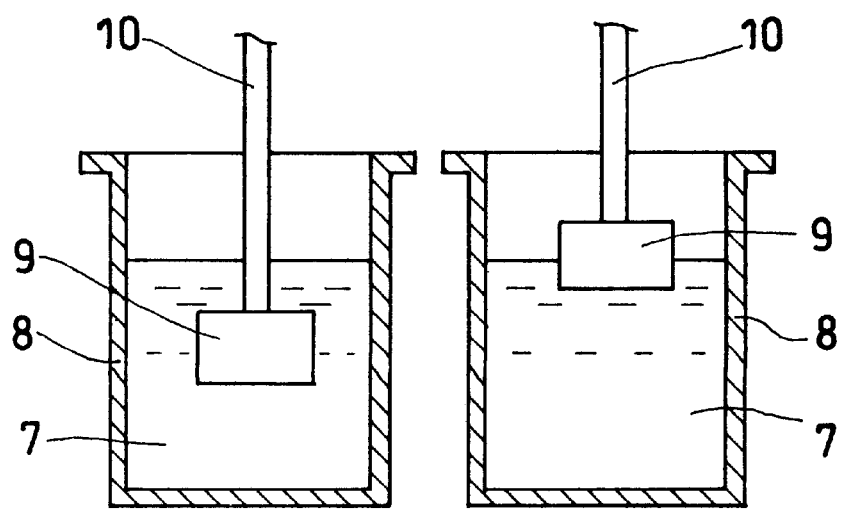
FIG. 3(a) is a sectional view showing a state in which the mass of reinforcing material is totally immersed in the melt.
FIG. 3(b) is a sectional view showing a state in which half of the mass of reinforcing material is immersed in the melt.

This contact may be effected according to any of the two patterns shown in FIG. 3. Specifically, according to pattern A, mass of reinforcing material 9 is totally immersed in the melt as shown in FIG. 3(a). According to pattern B, half of the mass of reinforcing material 9 is immersed in the melt as shown in FIG. 3(b).

After mass of reinforcing material 9 is immersed in the melt for a predetermined period of time, operating rod 10 is elevated again to withdraw mass of reinforcing material 9 from the melt. Thereafter, electric resistance heater 6 is de-energized to cool chamber 1 and solidify the melt. When the internal temperature of chamber 1 has fallen to a predetermined value, chamber 1 is opened and mass of reinforcing material 9 is removed. This mass of reinforcing material 9 is cut and its section is observed to examine the presence or absence of infiltration of the melt. In FIG. 2, numeral 11 designates a crucible rest. The introduction of the specified gas into chamber 1 is continued until chamber 1 is opened.

Examples of the method for restricting the flow of gas into mass of reinforcing material 9 include a method which comprises surrounding mass of reinforcing material 9 with a metal mold and the melt to seal it hermetically, and a method which comprises applying a finely particulate filler to the surfaces of mass of reinforcing material 9 that come into contact with the ambient gas. However, the present invention is not limited to these methods, but there may be employed any method that can restrict the flow of gas into mass of reinforcing material 9 without interfering with the object of the present invention.

When the melt of Mg or Mg alloy is infiltrated into mass of reinforcing material 9 while restricting the flow of gas into mass of reinforcing material 9, the gas within mass of reinforcing material.9 reacts with Mg to form a solid. Since no gas is easily supplied from the outside of mass of reinforcing material 9, a reduced pressure is created within mass of reinforcing material 9. Thus, the infiltration of the melt of Mg or Mg alloy is accelerated.

The present invention is further illustrated by the following examples. However, these examples are not to be construed to limit the scope of the present invention.

EXAMPLES 1-1 TO 1-15

Materials and Experimental Conditions

AZ91E (JIS MC2B) alloy which is a type of Mg alloy prescribed by the ASTM standards, Mg-6 wt. % Zn alloy and Mg-6 wt. % Zn-0.3 wt. % Ca alloy were used for the matrix.

Experiments were performed at a matrix melt temperature of 610° C., 660° C. or 680° C.

Various replacement gases which will be described later were used for the gas within the mass of reinforcing material and for the melting atmosphere.

The mass of reinforcing material was brought into contact with the melt according to any of the above-described patterns A and B.

Aluminum borate ($9Al_2O_3 \cdot 2B_2O_3$) whiskers [Alborex M20 (trade name); manufactured by Shikoku Chemicals Corp., Japan], carbon fibers and silicon carbide particles were used for the reinforcing material. Aluminum borate whiskers were shaped into a 15 mm×15 mm×30 mm rectangular form by means of a dry pressing machine, and then fired in an electric resistance furnace at 1,350° C. for 3 hours. Thus, the aluminum borate whiskers were self-sintered to form a mass of reinforcing material. Consequently, apart from aluminum borate constituting the reinforcing material, this mass of reinforcing material did not contain any metal oxide, finely divided metal or metal fluoride. The volume fraction of aluminum borate whiskers in this mass of reinforcing material was 20%.

Production Apparatus and Production Process

A vacuum melting furnace as described above with reference to FIG. 2 was used as the production apparatus. First of all, after a chamber 1 kept at room temperature was evacuated by means of a vacuum pump 2, a vacuum valve 3 was closed and a gas inlet valve 4 was opened. Thus, the air within chamber 1 was replaced by a specified gas. When the specified gas within chamber 1 reached a pressure of 1 atmosphere, a gas detection valve 5 was opened and the specified gas was introduced into chamber 1 at a flow rate of 3 liters per minute. In this state, a crucible 8 charged with Mg or Mg alloy 7 was heated by means of an electric resistance heater 6 to melt Mg or Mg alloy 7 and maintain the resulting melt at a predetermined temperature. Since a mass of reinforcing material 9 was attached to the tip of an operating rod 10 at the initial stage of the process, the air within mass of reinforcing material 9 was replaced by the same gas as the replacement gas for chamber 1, and mass of reinforcing material 9 was preheated to a temperature almost equal to that of the melt. When the melt reached a predetermined temperature, operating rod 10 was lowered to bring mass of reinforcing material 9 into contact with the melt.

After mass of reinforcing material 9 was immersed in the melt for a predetermined period of time, operating rod 10 was elevated again to withdraw mass of reinforcing material 9 from the melt. Thereafter, electric resistance heater 6 was de-energized to cool chamber 1 and solidify the melt. When the internal temperature of chamber 1 fell to 200° C., chamber 1 was opened and mass of reinforcing material 9 was removed. This mass of reinforcing material 9 was cut and its section was observed to examine the presence or absence of infiltration of the melt. Moreover, the introduction of the specified gas into chamber 1 was continued until chamber 1 was opened.

Next, Examples 1-1 to 1-15 are described in greater detail.

Example 1-1

Figure 2:
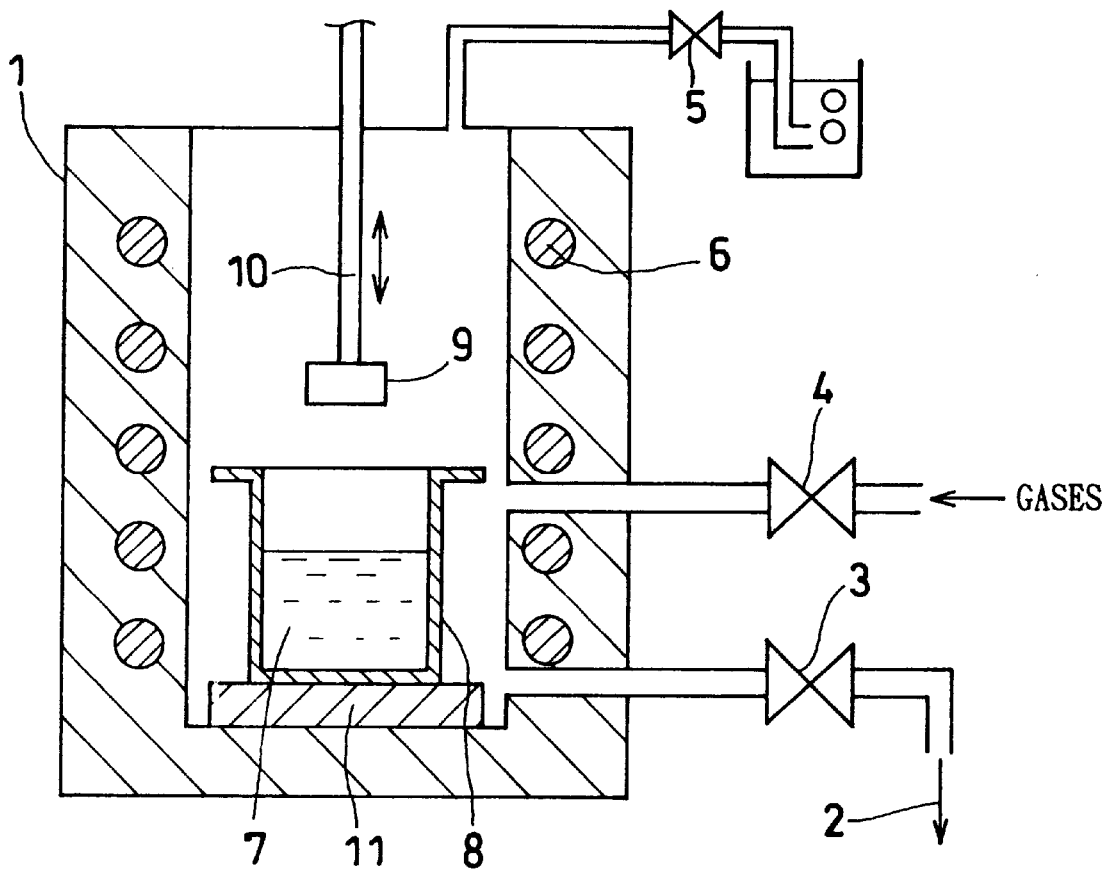
FIG. 2 is a sectional view showing the whole of a production apparatus which was used in Examples 1-1 to 1-15.

Using the above-described ASTM AZ91E (JIS MC2B) alloy as the matrix, the air within chamber 1 illustrated in FIG. 2 was replaced by pure Ar gas, the AZ91E alloy was melted and maintained at 660° C., and mass of reinforcing material 9 comprising aluminum borate whiskers was totally immersed in the melt according to pattern A. By observing the inside of crucible 8 through an inspection window made in the wall of chamber 1, it was confirmed that a large number of gas bubbles appeared on the surface of the melt. When this mass of reinforcing material 9 was cut and examined, it was confirmed that the AZ91E alloy had infiltrated throughout mass of reinforcing material 9 to form a perfect Mg alloy-based composite material.

Example 1-2

The matrix, melt temperature, replacement gas, and mass of reinforcing material 9 were the same as used in Example 1-1, and half of the mass of reinforcing material 9 was immersed in the melt according to pattern B. Observation through an inspection window revealed that the melt infiltrated to the upper end of the preform by capillary action. When this mass of reinforcing material 9 was cut and examined, it was confirmed that a perfect Mg alloy-based composite material had been formed.

Example 1-3

The matrix, replacement gas, method of contact, and mass of reinforcing material 9 were the same as used in Example 1-1, and mass of reinforcing material 9 was totally immersed in the melt according to pattern A. When this mass of reinforcing material 9 was cut and examined, it was confirmed that a perfect Mg alloy-based composite material had been formed.

Example 1-4

The matrix, melt temperature, method of contact, and mass of reinforcing material were the same as used in Example 1-1, and $N_2$ gas was used as the replacement gas. Mass of reinforcing material 9 was totally immersed in the melt at 660° C. according to pattern A. No gas bubbles were observed on the surface of the melt. However, when this mass of reinforcing material 9 was cut and examined, it was confirmed that a perfect Mg alloy-based composite material had been formed.

Example 1-5

The matrix, melt temperature, method of contact, and mass of reinforcing material were the same as used in Example 1-1, and a gaseous mixture composed of $CO_2$ and 0.3% $SF_6$ was used as the replacement gas. Although mass of reinforcing material 9 was totally immersed in the melt at 660° C. according to pattern A, no gas bubbles were observed on the surface of the melt. When this mass of reinforcing material 9 was cut and examined, the melt of Mg alloy did not infiltrate thereinto at all.

Examples 1-6 TO 1-15

The experimental conditions employed in Examples 1-6 to 1-15 and the experimental results thus obtained are shown in Table 1. In this table, an arrow pointing upward means "ditto". Moreover, the composition of the matrix is expressed by percentage by weight and the composition of the replacement gas is expressed by percentage by volume. Specifically, the matrix, melt temperature, replacement gas, method of contact, and mass of reinforcing material were altered in various ways, and the state of infiltration of the melt into mass of reinforcing material 9 was examined. From the results thus obtained, it was found that, when the melt was not substantially pressurized, its infiltration into mass of reinforcing material 9 depended solely on the composition of the gas within mass of reinforcing material 9. That is, when the gas within mass of reinforcing material 9 was replaced by a gas containing both not less than 0.1% by volume of $SF_6$ gas and a gas having one or more oxygen atoms in the molecular structure or a gas containing not less than 0.1% of $SO_2$ gas, the melt did not infiltrate into mass of reinforcing material 9 at all.

TABLE 1

| Example | Matrix | Temperature of melt | Replacement gas | Method of contact | Reinforcing material | Result |
|---|---|---|---|---|---|---|
| 1-1 | AZ91E | 660° C. | Ar | A | Aluminum borate whiskers | o |
| 1-2 | ↑ | ↑ | ↑ | B | ↑ | o |
| 1-3 | ↑ | 610° C. | ↑ | A | ↑ | o |
| 1-4 | ↑ | 660° C. | $N_2$ | A | ↑ | o |
| 1-5 | ↑ | ↑ | $CO_2$ + 0.3% $SF_6$ | A | ↑ | x |
| 1-6 | ↑ | ↑ | Ar + 0.5% $SO_2$ | A | ↑ | x |
| 1-7 | ↑ | ↑ | Air + 0.5% $SF_6$ | A | ↑ | x |
| 1-8 | ↑ | ↑ | $CO_2$ + 0.05% $SF_6$ | A | ↑ | o |
| 1-9 | Mg – 6% Zn | 680° C. | Ar | A | ↑ | o |
| 1-10 | Mg – 6% Zn – 0.3% Ca | ↑ | $N_2$ | A | ↑ | o |
| 1-11 | ↑ | ↑ | $CO_2$ + 0.3% $SF_6$ | B | ↑ | x |
| 1-12 | ↑ | ↑ | $CO_2$ | A | ↑ | o |
| 1-13 | ↑ | ↑ | Ar + 5% $CO_2$ | A | ↑ | o |
| 1-14 | ↑ | ↑ | $N_2$ | A | Carbon fibers | o |
| 1-15 | ↑ | ↑ | ↑ | A | Silicon carbide particles | o | o A composite material was obtained.
x No composite material was obtained.

Example 2

The same self-sintered aluminum borate whiskers as used in Examples 1-1 to 1-13 were used for mass of reinforcing material 9. The volume fraction of aluminum borate whiskers in mass of reinforcing material 9 was 20%.

In Examples 1-1 to 1-15, the gas used as the melting atmosphere for Mg or Mg alloy was the same as the gas within mass of reinforcing material 9, owing to the construction of the apparatus. In Example 2, however, the gas used as the melting atmosphere was different from the gas within mass of reinforcing material 9.

Figure 4:
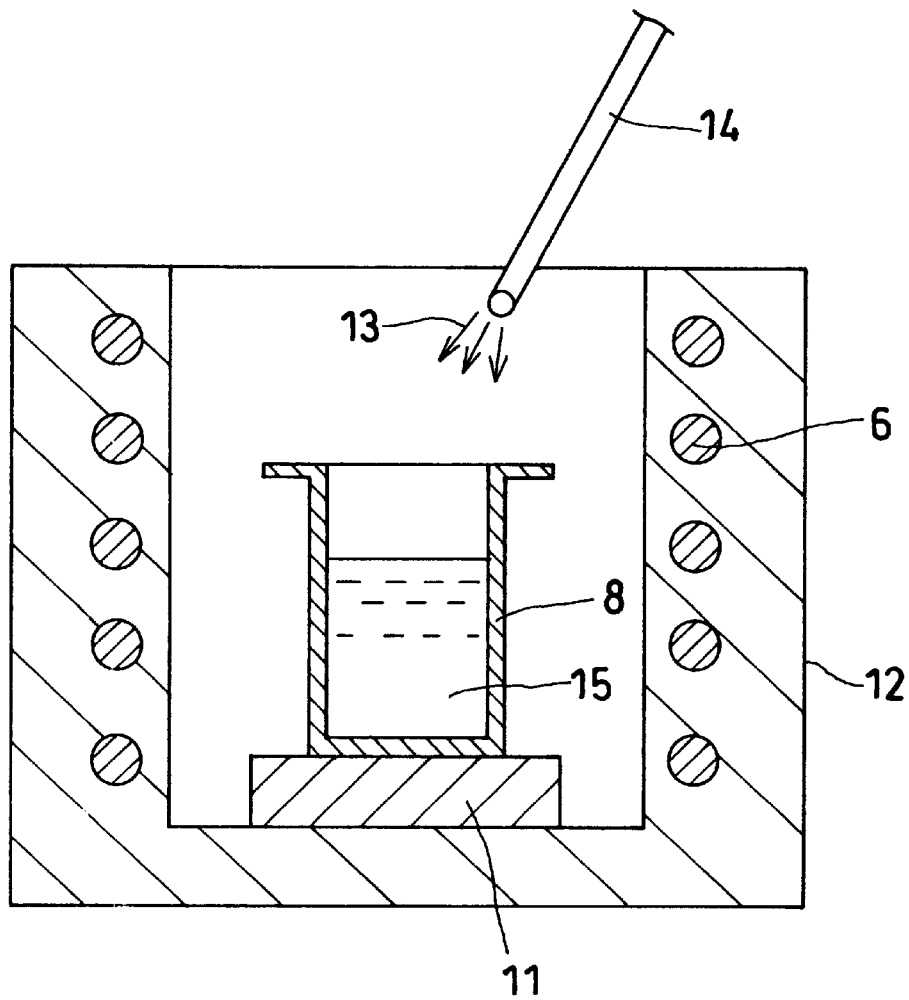
FIG. 4 is a sectional view showing a crucible and a furnace which were used in Example 2.
Figure 5:
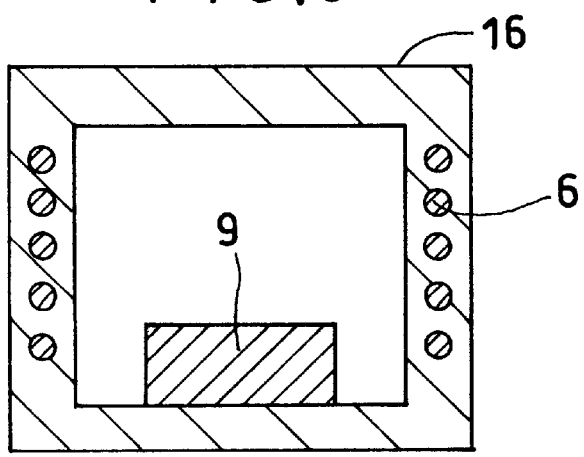
FIG. 5 is a sectional view showing a mass of reinforcing material and a furnace which were used in Example 2.
Figure 6:
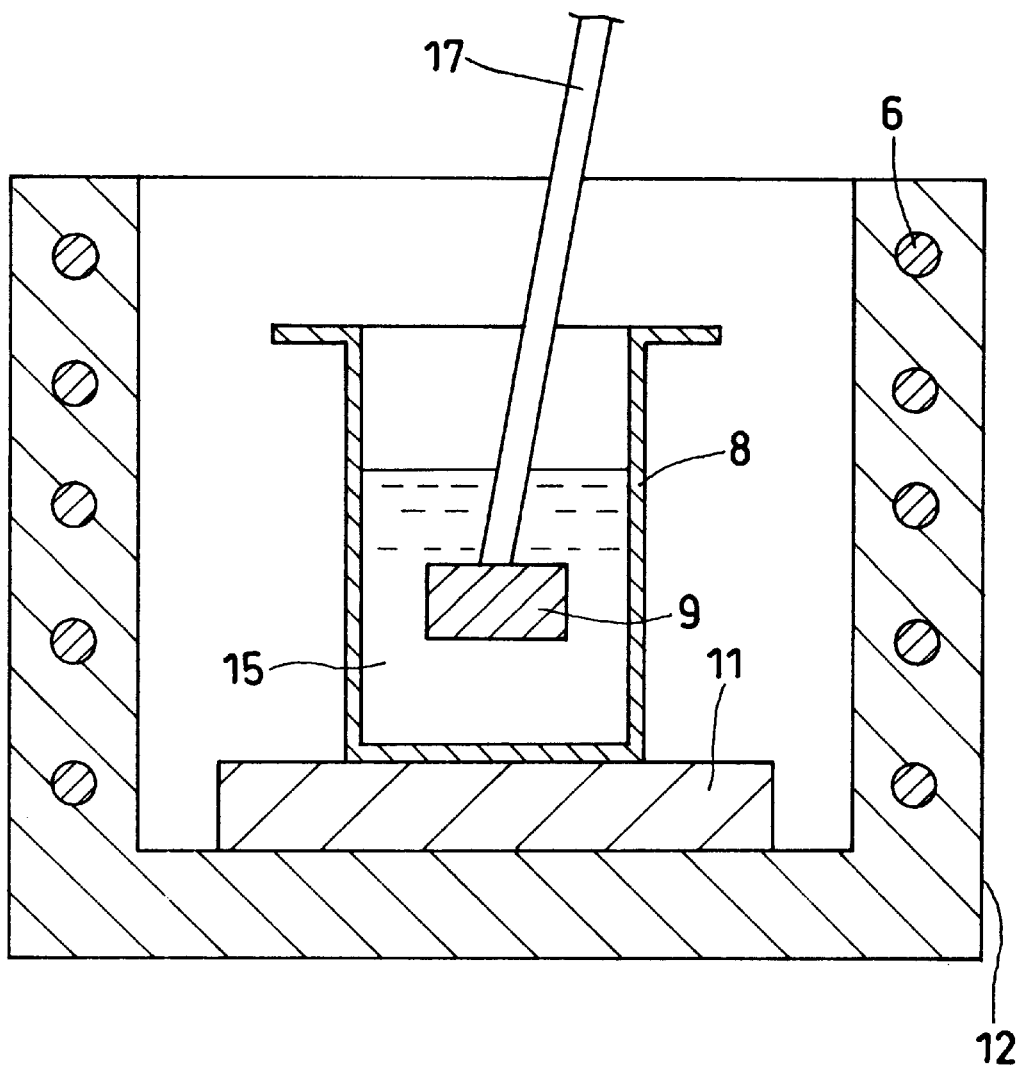
FIG. 6 is a sectional view showing a crucible and a furnace which were used in Example 2.
Figure 7:
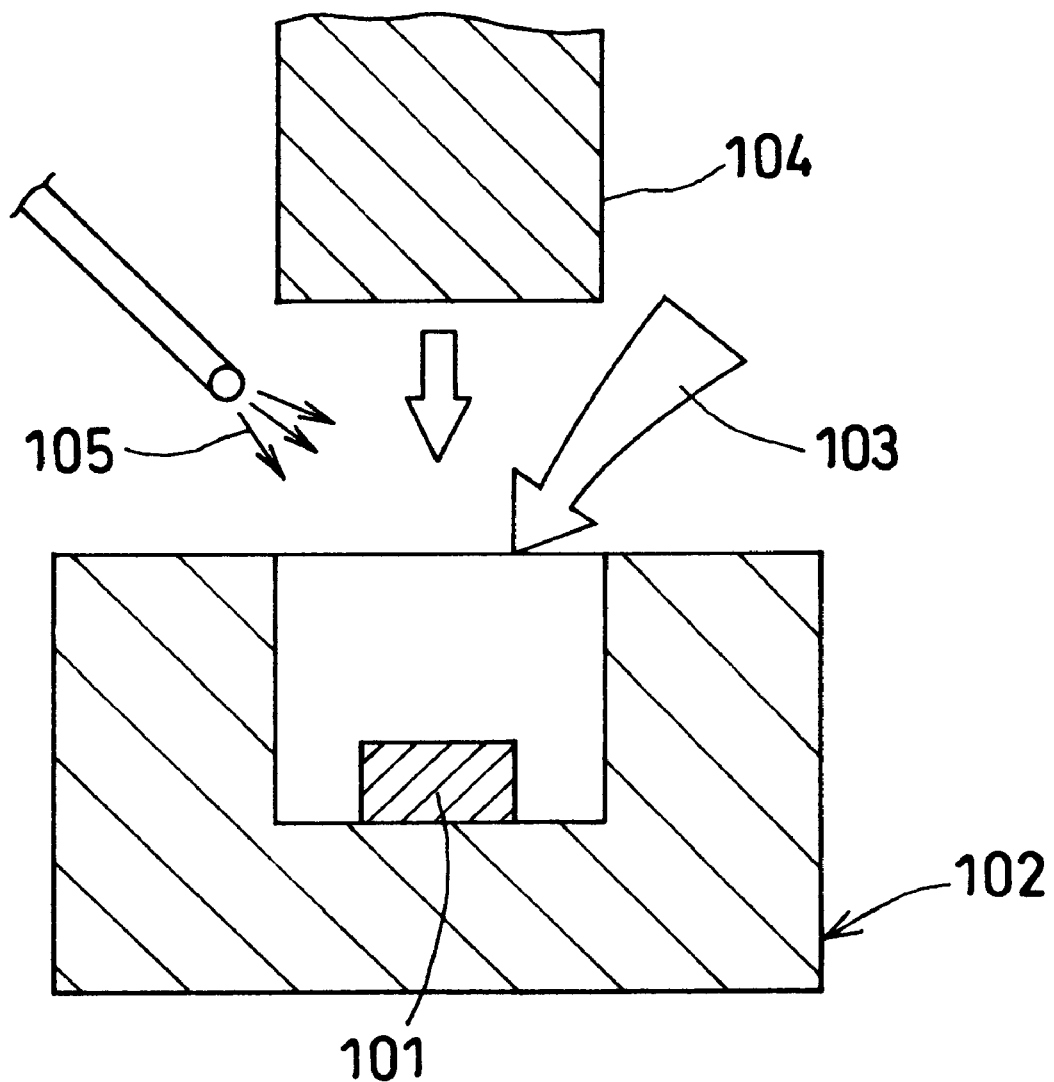
FIG. 7 is a sectional view showing an apparatus for producing an Mg-based composite material or an Mg alloy-based composite material according to the conventional forging cast process.

As illustrated in FIG. 4, pure Mg 15 serving as the matrix was melted and maintained at 700° C. in a vertical electric resistance furnace 12, while a gaseous mixture composed of $CO_2$ and 0.3% by volume of $SF_6$ was being supplied thereto by means of a gas inlet tube 14. On the other hand, using another electric resistance furnace 16, mass of reinforcing material 9 was preheated in air at 700° C. as illustrated in FIG. 5. This mass of reinforcing material 9 was taken out of furnace 16 by means of a jig 17 and, at once, totally immersed in the melt as illustrated in FIG. 6. After being immersed for a predetermined period of time, mass of reinforcing material 9 was removed and cooled. When this mass of reinforcing material 9 was cut and examined, it was confirmed that melt 15 had infiltrated throughout mass of reinforcing material 9 to form a perfect Mg-based composite material.

From this result, it can be seen that, in the present invention, $O_2$ (oxygen) gas is also useful as the gas within mass of reinforcing material 9.

The entire disclosure of Japanese Patent Application No. 8-304286 filed on Nov. 15, 1996 including specification, claims, drawings and summary are incorporated herein by reference in its entirety.

The entire disclosure of Japanese Patent Application No. 9-138134 filed on May 28, 1997 including specification, claims, drawings and summary are incorporated herein by reference in its entirety.

We claim:

1. A process for producing an Mg-based composite material or an Mg alloy-based composite material which comprises providing a mass of reinforcing material having therewithin a gas consisting essentially of $N_2$ gas, $O_2$ gas, $CO_2$ gas or a mixture thereof, wherein the combined amount of gas within said mass of reinforcing material is not less than 98% by volume of the total amount of the gas within said mass of reinforcing material and, among other impurity gases, the concentrations of $SF_6$ gas and $SO_2$ gas are each less than 0.1% by volume based on the total amount of the gas within said mass of reinforcing material; bringing at least a part of said mass of reinforcing material into contact with a melt of Mg or Mg alloy while restricting a flow of gas into said mass of reinforcing material, so as to infiltrate said melt into said mass of reinforcing material without substantially pressurizing said melt; and reacting the gas within said mass of reinforcing material with said melt to create a reduced pressure within said mass of reinforcing material and thereby enhance the infiltrating power of said melt of Mg or Mg alloy.

2. A process for producing an Mg-based composite material or an Mg alloy-based composite material as claimed in claims wherein the step of restricting the flow of gas into said mass of reinforcing material comprises immersing said mass of reinforcing material totally in said melt of Mg or Mg alloy, or surrounding said mass of reinforcing material with a metal mold and said melt.

3. A process for producing an Mg-based composite material or an Mg alloy-based composite material as claimed in claim 1, wherein the mass of reinforcing material comprises aluminum borate whiskers, carbon fibers, alumina fibers or carbon fibers.

4. A process for producing an Mg-based composite material or an Mg alloy-based composite material as claimed in claim 1, wherein the mass of reinforcing material is infiltrated without incorporation of a wettability-improving metal oxide in the mass of reinforcing material.

5. A process for producing an Mg-based composite material or an Mg alloy-based composite material as claimed in claim 1, further comprising a step of heating the mass of reinforcing material in a furnace having an atmosphere containing oxygen and said step of bringing at least a part of said mass of reinforcing material into contact with a melt of Mg or Mg alloy while restricting a flow of gas into said mass of reinforcing material comprises immersing the mass of reinforcing material into the melt.

6. A process for producing an Mg-based composite material or an Mg alloy-based composite material as claimed in claim 1, wherein the melt is a Mg-based alloy.

7. A process for producing an Mg-based composite material or an Mg alloy-based composite material as claimed in claim 1, wherein the mass of reinforcing material comprises a porous mass of sintered reinforcing material.

8. A process for producing an Mg-based composite material or an Mg alloy-based composite material as claimed in claim 1, wherein the melt consists essentially of Mg.

* * * * *